Sept. 1, 1964 P. L. ADAMS 3,147,164
METHOD OF MAKING SHAPED LAMINATED RESINOUS PRODUCTS
Filed April 6, 1959
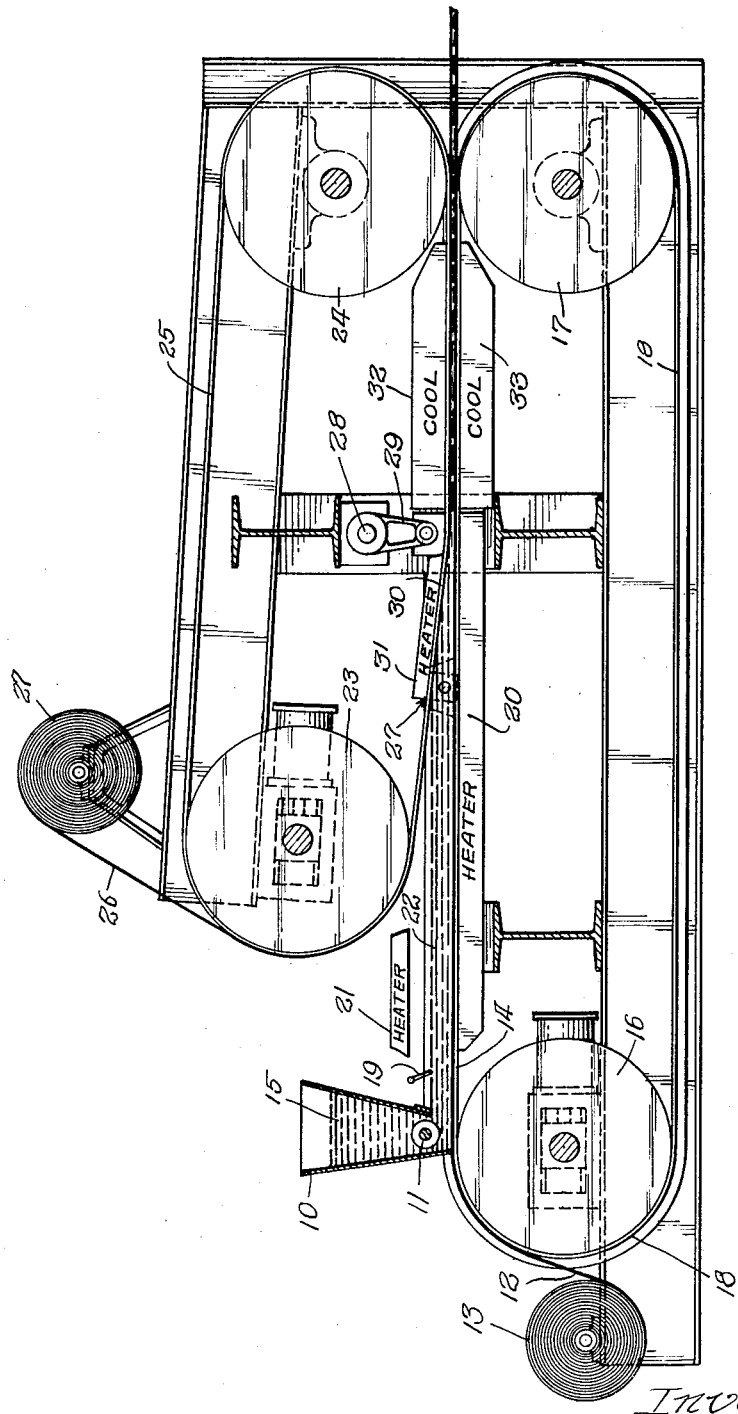

United States Patent Office

3,147,164
Patented Sept. 1, 1964

3,147,164
METHOD OF MAKING SHAPED LAMINATED RESINOUS PRODUCTS
Paul L. Adams, Dubuque, Iowa, assignor, by mesne assignments, to Caradco Incorporated, a corporation of Iowa
Filed Apr. 6, 1959, Ser. No. 804,102
3 Claims. (Cl. 156—62.2)

This invention relates to a method of making a laminated resinous product in a continuous process.

It is of course quite common to make laminated resinous products both for construction use and for decoration by bonding layers including resin containing surface sheets and intermediate resin containing members together under heat and pressure. The resins that have been proposed and that have been actually used in commerce include extremely large numbers of both thermoplastic and thermosetting resins. In fact, each annual issue of "Modern Plastics Encyclopedia," particularly the 1958 edition, discloses large numbers and varieties of resins that are suitable and that are actually used in making laminated resinous products.

In general, laminated resinous products have been made in the batch system in which a press or presses provided with a heating means are used to make the laminated products. An important feature of the present invention is the provision of methods for making shaped laminated resinous products in a continuous manner in which simple or standard pieces of equipment may be combined to practice the method of this invention.

Other features and advantages of the invention will be apparent from the following description of the invention including certain typical examples thereof.

In practicing the method of this invention there is provided a flexible enveloping member such as a flexible sheet having a thermo-active resin associated therewith, depositing on this member while it is being moved in a path of continuous deposit of fluent thermo-active resinous core material, folding the moving member to enclose the deposit on all sides and thereby form an assembly and then passing this moving assembly through a heated shaping die having an entrance and an exit with the heat of the die activating the resins to bind the assembly into an integral laminated product while pressure shaping the assembly to the desired shape. When the nature of the fluent core material is such that compression is required the die will taper from the entrance to the exit in order to apply compressive force as the assembly moves therethrough. Where an expansible core material such as a moldable resin is used, the die will be enlarged toward the exit in order to permit this expansion while still confining the assembly to apply similar shaping pressure thereto.

The assembly is caused to move and is forced through the die by a pulling force preferably located at a point beyond the die exit that is sufficient for the assembly to be cooled after exiting from the die to a temperature such that the laminated product will resist pressure deformation. This pulling force may be exerted by any means desired, such as a pair of ordinary driven pressure rollers between which the laminated product passes. In the preferred process of this invention the core material which is thermo-active is preheated before being deposited on the enveloping member to a temperature that is preferably above the initial setting temperature of the thermosetting resin but lower than the final setting temperature or in the case of a thermoplastic resin to a temperature that causes an initial plasticization of the resin. The resin of the enveloping member and of the core material may be either the same or different resins and if desired one or more may be thermoplastic while the other or others may be thermosetting.

The core material may be any of the materials prepared by the methods set out in Patents 2,706,160; 2,708,637; 2,779,683; 2,855,320; 2,864,715 and 2,872,330, all assigned to the same assignee as the present application. These core materials may be prepared by the methods of any of the examples of these patents and are thermoplastic materials that are readily moldable under heat and pressure and when so molded form hard, strong and moisture resistant products, all as explained in these patents. Other types of core materials may be used as the invention here is not concerned with any particular type of core material or of resin, as was pointed out above, as any moldable strong resin may be used as desired. Furthermore, the core material may comprise a foamed material such as foamed polystyrene, polyurethane or the like.

Foamed polystyrene is, of course, a well known material. It is preferably used here in its well known form of beads containing an expanding agent which expands upon heating. One type of beads before foaming has a density of about 35 pounds per cubic foot. These beads when expanded by heating form an adherent, strong, moisture resistant mass that may have a density as low as 0.25 pound per cubic foot dependent upon the time and temperature of heating and the space in which the polystyrene is permitted to foam. In general, it is preferred that these foamable beads be heated in the presence of water in order to generate steam which then is distributed between the beads for substantially even heating. One very well known and widely used form of foamable polystyrene beads is produced commercially by Dow Chemical Company.

The flexible enveloping member is preferably a fibrous sheet of which kraft paper is an excellent example. This fibrous material may also be a fabric such as cotton fabric or cloth, glass cloth, nylon fabric or asbestos fabric or any other sheet material with sufficient strength to withstand tearing as the assembly of sheet material and core material is pulled through the shaping and heating die. An excellent sheet material has been found to be kraft paper of between 10 and 20 mils thickness, impregnated with a resin solution and dried. Suitable resins are melamine-formaldehyde condensates, partly polymerized diallylphthalate, unsaturated polyesters homo-polymerized or co-polymerized with other unsaturated co-reactants such as styrene, diallyl phthalate, or methyl methacrylate; phenol-formaldehyde condensates, cresol-formaldehyde condensates, epoxy resin systems, phenol-furfural-formaldehyde condensates, and phenol-melamine-formaldehyde condensates. This last resin is particularly favored as it is one which reacts and sets in a very few seconds when heated within the approximate range of 300–400° F. Either thermosetting or thermoplastic resins may be used to impregnate or coat the flexible enveloping member such as the sheet material and typical thermoplastic resins, are styrene polymers and copolymers, polyacrylics, polyethylenes, polyvinyls, nylons, saturated polyesters, and cellulose derivatives such as cellulose acetate, cellulose acetate butyrate and ethyl cellulose.

In practicing the invention the core material is deposited upon the travelling sheet such as paper and another sheet is placed thereover. The bottom sheet is wider than the top sheet so that the edges can be turned to cover the edges of the top sheet with a small overlap in producing finished board. The core material is deposited while the bottom sheet of paper or the like is moving in a path. The top sheet is applied and the edges of the bottom sheet are overlapped to wrap the core material and form an assembly of core material and resin impregnated paper. Immediately after the bottom paper edges are folded over to enwrap the core material the paper and core material assembly is led through the heat shaping die. The die has sufficient surface contact with the moving assembly so that the assembly is heated within the die to the predetermined required temperature and for the predetermined required time to set the thermoset resin or plasticize and consolidate the thermoplastic resin. Although the die is heated and, of course, maintains the heat in the assembly the principal heat for the assembly is preferably obtained by a preheating of the core material before it is deposited on the traveling sheet.

The assembly is preferably drawn through its path, including the passage through the die, by means such as a set of feed rolls (not shown) that are placed beyond the exit of the die and between which the assembly passes and is gripped.

The single view in the accompanying drawing discloses semi-diagrammatically an apparatus for performing the method of this invention. As shown here, the moldable core material is fed from a hopper 10 by means of an agitator 11 onto the top surface of a bottom sheet of paper 12 that is led from a bottom roll 13. This paper is held on the top surface of a bottom endless metal belt 14 which passes beneath the hopper 10 to receive the core material 15. The belt 14 is endless and passes over a pair of rollers 16 and 17 with the roller 16 being adjustable. The belt 14 is provided at its edges with edge guides 18.

After receiving the material 15 from the hopper 10, the material is leveled by means of an oscillating leveler 19. The belt 14 then passes over a heater 20 which may be heated by steam and the material passes beneath an infra red heater 21. Located above the layer of material 22 on the belt 14 is another pair of rollers 23 and 24 with the roller 23 being adjustable. Passing around these rollers is a second endless metal belt 25 for applying pressure to the upper surface of the material 22.

A top sheet of paper 26 is drawn from a top roll 27 and is guided by the top belt 25 into contact with the material 22. Both the belts 14 and 25 pass between the converging upper and lower platens of heated die 27. In order to perform the compacting operation more efficiently, the smaller end of the die is vibrated as by means of an eccentric 28 operating through a connecting rod 29. Thus, the upper platen 30 of the die 27 acts as a vibrating compactor shoe and is provided with its own heater 31 which may be steam heated.

From the die 27 the belts 14 and 25 lead the assembly of compacted core and upper and lower paper sheets through the upper and lower cooling platens 32 and 33 which may be cooled as with water to cool the assembly to below the softening point of the resin contained in the paper sheets 12 and 26.

Where the core material is of the non-expanding type which must be compacted such as any of the materials described and set out in any of the examples of the above listed patents, the die preferably comprises top, bottom and side plates with the top and bottom plates converging toward each other from the entrance to the exit of the die in order to apply pressure to the assembly in order to compact and consolidate the core material and mold the resin impregnated sheet to the core material to provide the tightly bonded, strong board. As mentioned above, these converging upper and lower die faces also heat the various resins in order to make an integral molded board. The two side faces of the die are parallel to each other as the width between these side faces determines the width of the exiting board. If desired, auxiliary cooling means may be provided, such as a water spray at the exit of the die, in order to speed the cooling of the board.

In order to reduce the resistance or frictional drag of the assembly through the die one surface member such as a top die plate may be vibrated rapidly through short periods of vibration.

In some instances it has been found desirable to place a continuously moving sheet of resin on either the bottom or top surface of the core material, or both, and to apply the paper or the like around this assembly of core material and resin. Where this is done any of the core resins as described above may be used and in actual practice a polyester resin has been found to be excellent for this purpose. The sheet of resin when used is placed between the core material and the top sheet of paper or the like while all members are travelling in their continuous path. The resin improves the bond between the top sheet and the core material and also impregnates the paper or similar top sheet. If desired, this sheet may or may not be impregnated with a resin.

The continuous method of this invention has a number of new and unobvious advantages. One advantage, of course, is that boards can be made in continuous lengths and then cut to the desired size in a method that is faster and less expensive than the ordinary batch method. Also the method of this invention permits a continuous and constant control of time and temperature of forming the laminated products. The continuous process of this invention also brings about progressive increases in density and pressure as the assembly moves through the heated die. This permits gases to escape from the assembly during the reactions in the die with these gases passing to the rear through the less dense portions of the assembly. As the assembly passes through the die and is compressed the resistance to pull of course increases. However, this is compensated for by the fact that the density and strength of the product also increases as the assembly passes through the die. By the time the assembly has been pulled completely through the die the composite structure is bonded into an integral whole and is thus quite strong.

As mentioned previously, when an expandable core is used the die will have diverging top and bottom faces from entrance to exit in order to permit this expansion. By predetermining the angle of divergence it is, of course, possible easily to control the final density of the core material as this serves to limit expansion of the expandable material. This control of expandable resins is of course well known in the art.

*Example 1*

In this example a board ten inches wide and one-quarter inch thick was prepared by first soaking two rolls of kraft paper, 10 inches wide and 12 inches wide, each 15 mils thick, in a saturated solution of phenol-melamineformaldehyde low molecular weight resin (substantially equal mol proportions of the three ingredients) dissolved in water. After thorough impregnation the paper was dried to leave a deposit of the resin in the paper. Then a granular moldable composition prepared from finely divided lignocellulose such as Ponderosa pine of 30 mesh and 9% by weight of sulfur, according to the method of Example 1 of Glab Patent 2,864,715, was preheated to a temperature of 400° F. While the 12 inch paper was led from the roll the preheated core material was immediately deposited on the paper to cover slightly more than one-half the paper to a depth of one-half inch. Immediately after deposition the 10 inch paper was placed over the core material and the edges of the bottom sheet were folded over the top sheet to make a package assembly about ten inches wide and of an average thickness of about one-half inch. The paper completely enveloped the core material. These operations took place while the sheets and core were moving, and the resulting assembly was then pulled through a converging die having an entrance opening about ten inches wide and one-half inch thick. The die faces in contact with the assembly were two feet long and the die was heated as by internal steam passages to a temperature of about 350° F. at the entrance and about 250° F. at the exit. The assembly was pulled through the die at about four feet per minute so that the assembly at any point was in the die about 30 seconds. The assembly was pulled through the die by a pair of driven rollers located about ten feet beyond the exit of the die and between which the resulting board passed.

In the preferred process the core material is heated completely to its thermo-active temperature before being deposited upon the traveling sheet. The temperature to which the core material is thusly preheated is sufficiently to thermo-activate not only the core material but the other resins in the assembly as well. Thus there is no necessity for requiring a rise in temperature of the assembly during the assembly's passage through the die since the heat transfer here would not be rapid enough.

*Example 2*

In this example substantially the same method as set out in Example 1 was followed except that here the resin in the paper was a phenol-furfural-formaldehyde resin of low molecular weight while the core material was prepared according to Example 3 of Glab Patent 2,864,715.

*Example 3*

In this example substantially the same method as in Example 1 was followed except that here the core material was prepared according to the example beginning at column 3, line 46, of Glab Patent 2,872,330.

*Example 4*

Here the method of Example 1 was substantially followed except that the core material was prepared from a foamable polystyrene in the form of beads and the die diverged from entrance to exit from a thickness of one-quarter inch to a thickness of one-half inch in order to provide increasing space for expansion of the polystyrene.

*Example 5*

In this example no core material was employed but about ten thicknesses of the impregnated paper of Example 1 were used. Here the traveling paper was heated to a thermo-activating temperature for the resins by passing through an oven (the temperature here was about 400° F.) and the superposed sheets of paper were passed through a heated die heated to about 400° F. and provided with converging top and bottom faces to compress the assembly of paper sheets into a board.

A principal feature of this invention is the utilization of the increase in strength of the paper as the resins become thermo-activated during the process of the invention. Thus it is this increase in strength that makes the process practical, as the core material itself in the process has relatively little tensile strength. In contrast, the tensile strength of the paper during the process increases to more than 20,000 pounds per square inch. Thus the force required to move the assembly through the process is not dependent on the thickness of the assembly, or on the tensile strength of the core material, but only on the strength of the sheet material. It is, of course, necessary that the surface coefficient of friction of the material passing through the die shall be low enough that the resistance to the passage through the die will not exceed the tensile strength of the sheet material.

The process is equally workable without using core material, as is shown in Example 5 above. Thus, if desired, shaped or hollow sections of impregnated sheet material may be formed by this process without any core material. Where hollow sections are produced, these may be left hollow or may be filled with a filling material, such as any of the above-discussed foamable materials as desired.

In order to reduce the coefficient of friction at the surfaces of the die any of the usual coefficient reducing materials may be used. Thus the die faces may comprise Teflon members, molybdenum sulfide members or the like. Similarly, the assembly may be carried through the die between upper and lower flexible belts having die contacting surfaces of low friction coefficients. Other methods of reducing the coefficient of friction may of course be used if desired.

The term "thermo-active" used herein indicates resins that are activated by heat. Thus thermosetting resins are set, consolidated and hardened by heat while thermoplastic resins are softened and consolidated by heat and then hardened by the withdrawal of heat (cooling).

Having described my invention as related to the embodiments set out herein, it is my intention that the invention be not limited by any of the details of description, unless otherwise specified, but rather be construed broadly within its spirit and scope as set out in the accompanying claims.

I claim:

1. The method of making a laminated resinous product, comprising: providing a flexible enveloping member having a thermo-active resin associated therewith; moving said member in a path; depositing on said moving member a continuous deposit of fluent thermo-active resinous core material; shaping said moving flexible member to at least partially enclose said deposit and form a moving assembly; and heating said assembly to thermally activate said resin and said core material while simultaneously altering the cross sectional shape of said assembly.

2. The method of making a resinous product, comprising: providing a flexible enveloping sheet having a thermo-active resin associated therewith; moving said sheet in a path; depositing on said moving sheet at a location in the path a continuous deposit of fluent thermoactive resinous core material preheated to a thermo-active temperature; enclosing said deposit while moving said sheet and said deposit to form a moving enclosed assembly; and heating said assembly to thermally activate said resin and said core material while simultaneously altering the cross sectional shape of said assembly.

3. The method of making a resinous product, comprising: providing a flexible enveloping bottom sheet having a thermo-active resin associated therewith; moving said sheet in a path; preheating a fluent thermo-active resinous core material to at least a thermo-active temperature; depositing on said moving sheet a continuous deposit of said preheated core material; applying a moving top sheet having a thermo-active resin associated therewith to said moving core material; folding at least said moving bottom sheet to enclose said deposit and form a moving enclosed assembly; and heating said assembly to thermally activate said resin and said core material while simultaneously altering the cross sectional shape of said assembly.

References Cited in the file of this patent

UNITED STATES PATENTS

| | | |
|---|---|---|
| 2,343,740 | Birmingham | Mar. 7, 1944 |
| 2,526,945 | Gray | Oct. 24, 1950 |
| 2,641,641 | Coffman | Mar. 17, 1953 |
| 2,719,808 | Elmendorf | Oct. 4, 1955 |
| 2,722,735 | Beamish | Nov. 8, 1955 |
| 2,728,703 | Kiernan et al. | Dec. 27, 1955 |
| 2,784,763 | Shorts | Mar. 12, 1957 |
| 2,831,532 | Kasper | Apr. 22, 1958 |
| 2,855,021 | Hoppe | Oct. 7, 1958 |
| 2,890,147 | Pearson et al. | June 9, 1959 |
| 3,037,897 | Pelley | June 5, 1962 |